Patented Aug. 21, 1928.

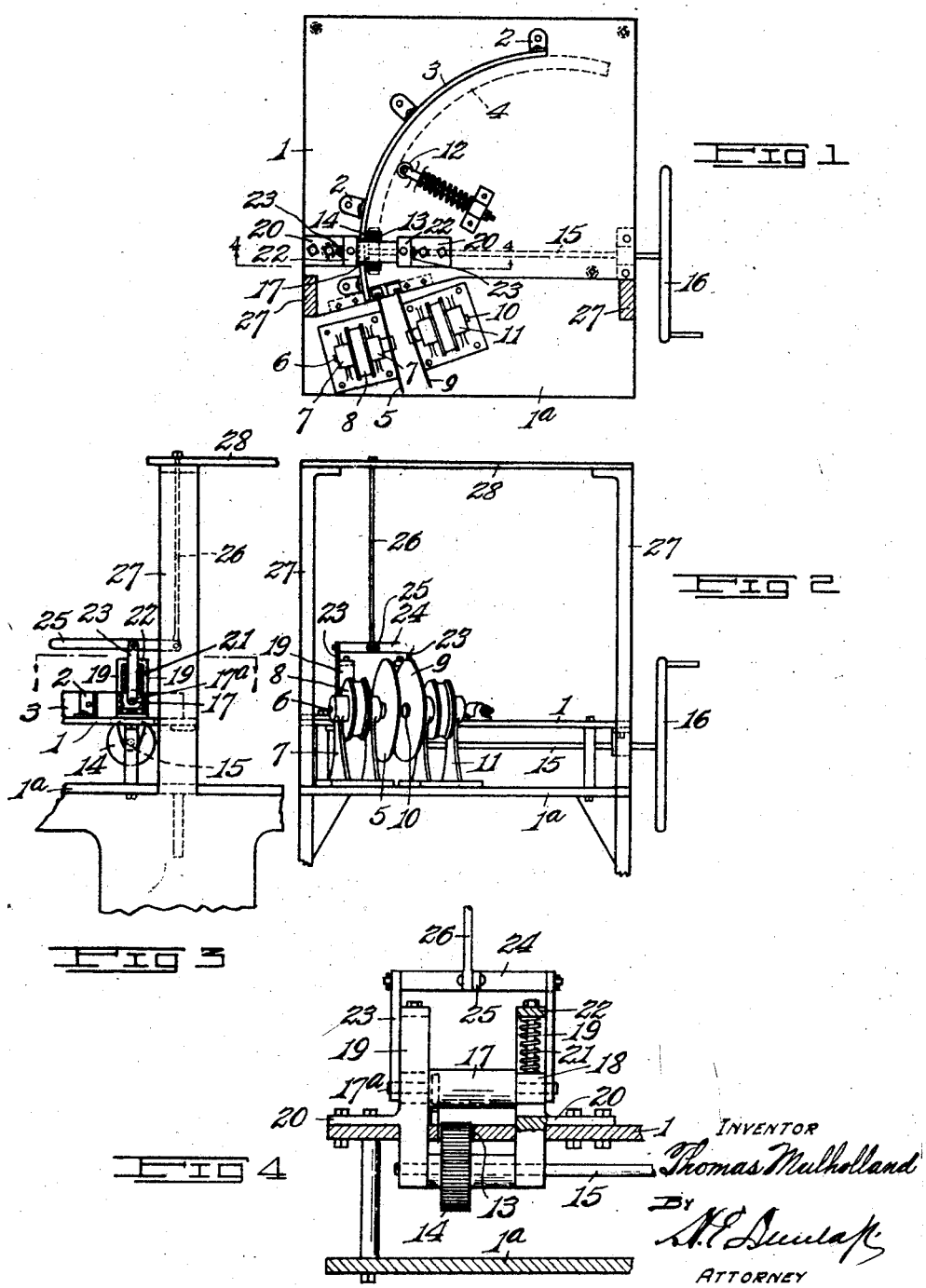

1,681,248

UNITED STATES PATENT OFFICE.

THOMAS MULHOLLAND, OF WHEELING, WEST VIRGINIA, ASSIGNOR, BY DIRECT AND MESNE ASSIGNMENTS, TO VALLEY RUBBER COMPANY, OF WHEELING, WEST VIRGINIA, A CORPORATION OF WEST VIRGINIA.

MACHINE FOR TRIMMING STRIPS OF RUBBER.

Application filed July 29, 1925. Serial No. 46,825.

This invention relates to apparatus for trimming strips of rubber, and it has for its primary object to provide a machine for trimming and planing the inner and outer faces of strips of rubber produced by the annular cutting of worn or discarded solid-rubber tires into strips. More specifically stated, it is the aim of the present invention to provide a machine for removing from the outer faces of strips of the character mentioned the worn or uneven faces which, in the tire, constituted the tread surface; and at the same time for shaving off or planing from the inner face such a thickness as will render said face free from surface inequalities.

In describing the invention in detail, reference is herein had to the accompanying drawings, in which—

Figure 1 is a horizontal sectional elevation of the invention;

Figure 2 is a front elevation of the same;

Figure 3 is a partial side elevation; and—

Figure 4 is an enlarged detail section taken substantially on line 4—4, Fig. 1.

Referring to said drawings, 1 indicates a stand or table upon the top face of which is attached, as by brackets 2, a horizontal guide 3 of arcuately curved form, against the inner face of which may be conformably mounted a rubber strip 4, indicated in broken lines in Fig. 1, which is to be acted upon. Located adjacent to the forward end of said guide 3 is a rotary cutting disk 5 which, as the rubber strip is advanced, is adapted to slice off an even or uniform thickness of the outer face portion of said strip for effecting the removal of the uneven or marred surface which, in the tire from which the strip was sheared or cut, constituted a part of the tread. Said disk, which is carried by the end of a shaft or spindle 6, is spaced inward from the inner surface of the adjacent end of the guide 3 to effect removal of the required thickness of the outer tread surface of the strip. While the shaft or spindle 6, journaled in suitable bearing brackets 7 carried by a supporting member 1ª of the stand 1, may be rotated by any suitable means, a pulley 8 adapted to be connected by an endless belt to a source of motive power is shown for illustrative purposes.

A second cutting disk 9 may be employed for effecting the removal of a sufficient thickness from the inner face of the rubber strip to render the remaining portion of the latter of uniform desired thickness throughout its length, said disk 9 being located in spaced relation to the disk 5. Said disk 9 is carried by a shaft or spindle 10 mounted on suitable bearing brackets 11 carried by the supporting member 1ª of the stand 1.

A spring-pressed roller 12 is mounted on the stand to exert yielding pressure against the inner face of the rubber strip for maintaining the latter in closely seated relation to the guide 3.

Protruding slightly above the top surface of the stand 1, as through an opening 13 provided therefor in said top, is the upper peripheral portion of a wheel 14 carried by a suitably journaled shaft 15 which may be rotated in any suitable manner, as by a crank or hand-wheel 16 fixed on an end thereof. Said wheel, which preferably has its periphery milled or otherwise roughened, directly underlies the forward end portion of the rubber strip and is designed to advance said strip by friction generated between it and the latter as it is rotated forwardly. A roller 17 is disposed in overlying pressure-exerting relation to the top surface of the strip at a point above the position occupied by the friction wheel or disk 14, said roller being adapted to maintain the strip in closely seated frictional relation to said wheel or disk. Said roller is journaled in bearing blocks 18 which are vertically movable in guideways provided therefor between parallel guide members 19 mounted upon brackets 20 carried by the stand 1. Springs 21 interposed between said bearing blocks 18 and a cross-piece 22 carried by the upper ends of the guide members 19 normally maintain the blocks yieldingly depressed for holding said roller seated upon the underlying rubber strip. Upright links 23 have their lower ends pivotally mounted on the bearing blocks 18, or upon the protruding spindles 17ª of the roller 17, and have their upper ends attached in like manner to the ends of a horizontal bar or cross-head 24 carried in a fixed position intermediate the ends of a hand lever 25 which has an end pivotally mounted upon a fixed member of the structure, as upon a depending rod 26 carried by a stand superstructure which, as herein shown, includes frame members 27 and 28.

In practice, the strip 4 to be acted upon is conformably seated against the curved guide 3 with the roller 12 seated against its inner face. The feed roller 17 is then elevated by means of the hand lever 25 against the tension of springs 21, and while so elevated the forward end of said strip is introduced between said roller and the underlying feed disk or wheel 14. Said feed roller is then lowered upon said strip, whereupon the latter is advanced with respect to the cutting disk by rotation of said wheel 14, effected by turning the hand wheel 16.

What is claimed is—

A machine for trimming rubber strips, comprising a table-like support for a strip, an arcuately curved guide carried by said support and against which the strip is held, a rotary cutting disk with respect to which said strip is advanced lengthwise for cutting from the latter a surface layer of uniform thickness, a rotary feed disk in underlying relation to a portion of said strip, means for exerting yielding pressure upon said strip for maintaining the latter firmly engaged with said feed disk, and means for rotating said feed disk.

In testimony whereof, I affix my signature.

THOMAS MULHOLLAND.